United States Patent [19]
Syrinek et al.

[11] Patent Number: 5,880,230
[45] Date of Patent: Mar. 9, 1999

[54] SHORTSTOP AGENTS FOR VINYL POLYMERIZATIONS

[75] Inventors: Allen R. Syrinek; Hester A. Clever, both of Richmond, Tex.

[73] Assignee: Nalco/Exxon Energy Chemicals, L.P., Sugar Land, Tex.

[21] Appl. No.: 1,964

[22] Filed: Dec. 31, 1997

[51] Int. Cl.⁶ .................................................. C08F 2/42
[52] U.S. Cl. .............................. 526/83; 526/82; 526/84; 526/85; 526/335; 526/340; 546/242
[58] Field of Search .................... 526/83, 84, 82, 526/85, 335, 340; 546/242

[56] References Cited

U.S. PATENT DOCUMENTS

| | | | |
|---|---|---|---|
| 3,222,334 | 12/1965 | Demme | 260/84.7 |
| 3,402,138 | 9/1968 | Albert et al. | 260/29.7 |
| 4,466,905 | 8/1984 | Butler et al. . | |
| 4,670,131 | 6/1987 | Ferrell | 208/48 AA |
| 5,254,760 | 10/1993 | Winter et al. | 585/5 |
| 5,258,138 | 11/1993 | Gatechair et al. . | |
| 5,290,888 | 3/1994 | Gatechair et al. . | |
| 5,312,952 | 5/1994 | Grossi et al. . | |
| 5,384,372 | 1/1995 | Lattime | 526/83 |
| 5,396,004 | 3/1995 | Arhancet et al. . | |
| 5,627,248 | 5/1997 | Koster et al. | 526/217 |
| 5,648,574 | 7/1997 | Arhancer et al. . | |

FOREIGN PATENT DOCUMENTS

| | | |
|---|---|---|
| 0 467 848 A1 | 1/1992 | European Pat. Off. . |
| 0 656 371 A2 | 7/1995 | European Pat. Off. . |
| 0 791 573 A1 | 8/1997 | European Pat. Off. . |
| 2113246 | 11/1971 | Germany . |

OTHER PUBLICATIONS

SciFinder, Jul. 2, 1997, Abstracts Ger. Offen., 7 pp. Coden:GWXXBX.
De 3836777 A1 900503; Hoerpel, G.; Pangratz, J.; De 88–3836777 881028.
"Polymerization–Stopping Agents", G. J. Antlfinger & C. H. Lufter.
Rubber and Plastics News, Oct. 30, 1989, pp. 16–18; "Crosslinking systems that avoid nitrosamines"; pp. 1,5 OSHA might issue nitrosamine warning.

*Primary Examiner*—Fred Teskin
*Attorney, Agent, or Firm*—Thomas M. Breininger

[57] ABSTRACT

The present invention relates to a method of terminating a free-radical initiated emulsion polymerization by utilizing a shortstopping agent that contains a stable nitroxyl free-radical or is capable of forming a stable nitroxyl free radical in situ. Besides more effective stopping of polymerization, the present invention does not contain nitrosamine precursors nor is the shortstop agent easily removed during latex and polymer processing.

9 Claims, No Drawings

SHORTSTOP AGENTS FOR VINYL POLYMERIZATIONS

BACKGROUND OF THE INVENTION

1. Field of the Invention

This invention relates to the provision of a new class of shortstop agent for use in the polymerization of vinyl monomers. The new class of shortstop agents are compounds which form stable nitroxyl free radicals. Advantages of the use of this new class of materials over those currently used include less volatility, less probability of forming nitrosamine precursors, and superior performance in terminating free radicals.

2. Introduction

In free-radical emulsion polymerization, the properties of the polymer formed are dependent upon monomer conversion. The best properties of the polymer often occur at 55 to 75% conversion. The ability to "shortstop" the polymerization is often critical to the production of polymers having the proper physical characteristics. Termination of polymerization at a particular time is especially critical in the production of synthetic rubber. By the term "shortstop" as used herein is meant a process for ending polymer chain propagation at a specific point in time so as to obtain desirable polymer properties including molecular weight distribution.

Free-radical polymerization consists of three distinct mechanisms: 1) initiation of alkyl radical by catalyst, 2) propagation of polymer chain by addition of monomer to growing alkyl radical, and 3) termination of growing alkyl radical by reaction with another radical or with another substance that forms a product which either retards or stops further reactions with monomers. It is recognized that a reaction can be stopped by destruction of the initiator, by prevention of propagation, or by termination of the growing alkyl radical. Usually a shortstop is selected that works on all three mechanisms. Shortstop agents and the reason for utilizing shortstop agents in the production of synthetic rubber latex are disclosed in "Polymerization-Stopping Agents, G. J. Antlfinger and C. H. Lufter, Industrial and Engineering Chemistry, Volume 45, No. 1, pages 182–185 January, 1953. Usually some degree of polymerization or crosslinking continues after shortstop agents are added.

Two of the most successful current commercial shortstop agents are diethyl-hydroxyl amine and isopropylhydroxyl amine. Another example of a commercial shortstop agent is a combination of sodium dimethyldithiocarbamate (DTC) and diethylhydroxyl amine (DEHA). These work in conjunction to very effectively stop the polymerization. However, this combination has recently come under scrutiny because these components are nitrosamine precursors, (Crosslinking systems that avoid nitrosamines, Ehrend, Helfried, Rubber and Plastics News, Oct. 30, 1989, page 17–18). U.S. Pat. No. 5,384,372 to Lattime recognizes the nitrosamine generation problem and proposes the use of isopropylhydroxylamine and salts thereof to avoid nitrosamine formation. Likewise EP Application 656,371A2 to Maestri also deals with this potential problem by proposing the use of isopropylhydroxylamine salts in combination with a polysulfide. Recent patents show efforts to develop shortstop materials which avoid or attempt to minimize the formation of nitrosamine materials. These patents typically disclose the use of materials which do not contain or degrade to secondary amines. DE 88-3836777 A1 Hoerpel et al. discloses the use of hydroxydithiobenzoic acid and its water soluble salts as free radical deactivators. Generally a sulfur compound is needed in conjunction with a hydroxylamine to both degrade the catalyst and terminate alkyl radicals. When either material is used alone, we believe that detrimental changes in the polymer occur as measured by changing Mooney viscosity.

The stable nitroxyl free radical (SNFR) is known to quickly combine with alkyl free-radicals to terminate polymerization. The subject compounds are known to prevent polymerization from propagating during the manufacture, purification, and storage of vinyl monomers such as butadiene, styrene, acrylates, acrylonitrile and other vinyl monomers. The use of stable nitroxyl radicals in this fashion are disclosed in U.S. Pat. No. 4,670,131 and U.S. Pat. No. 5,254,760, the disclosures of which are both hereinafter incorporated by reference into this specification. While SNFRs have been used in the applications above, they have not been utilized to the knowledge of applicants as short-stopping agents for emulsion polymerization of vinyl or diene monomers, and particularly in the preparation of synthetic rubber. While SNFRs are used at very low concentrations to inhibit polymerization of vinyl monomers during manufacture, purification, storage and transport where polymerization is due to incidental free radicals from heat or oxygen, they have not been utilized as shortstopping agents in polymerizations that are initiated by free-radical catalysts for the express purpose of producing polymer. This is especially true when the free-radical catalysts are added in such quantity to cause polymerization to proceed quickly. The SNFRs are known not to react readily with peroxy initiators or their free-radicals. Also, because of the nitroxyl functionality, they may have been cursorily dismissed as nitrosamine precursors. For these reasons SNFRs have not been used as shortstop agents.

Surprisingly, because SNFRs react so rapidly with alkyl radicals, they have proven to be very effective as shortstop agents in vinyl and diene free-radical polymerizations, and particularly the free-radical polymerization to produce various latex rubbers. Even though a free-radical catalyst used to manufacture latex rubber may still be generating free-radicals that initiate alkyl radicals, the rapid terminations of alkyl radicals by SNFRs do not allow for changes in conversion or molecular weight.

Examples of SNFRs are given in Winter and Ferrell both previously incorporated by reference into this specification. A particularly preferred SNFR is 4-hydroxy-2,2,6,6-tetramethylpiperidine-1-oxyl. An example of a compound that would form a SNFR in situ is 1,4-dihydroxy-2,2,6,6-tetramethylpiperidinium formate. It would react with peroxy catalyst to "kill" the catalyst and produce a SNFR. Diethylhydroxyl amine (DEHA) and isopropylhydroxyl amine (IPHA) do not form SNFRs. Though compounds which kill the catalyst may not be needed when SNFRs are used, an effective amount of SNFR employed as shortstopping agents may be used in combination with DEHA, IPHA, or sulfur compounds such as sodium polysulfide or hydroxy-dithiobenzoic acid when such materials are utilized.

An additional improvement, over DEHA/DTC combination is believed to be the reduced level of volatile nitrosamine precursors. This is because of the difficulty of forming nitrosamines with SNFRs. If nitrosamines form, it is believed that the relatively high molecular weight of SNFRs would make resultant nitrosamines non-volatile.

Another benefit of the SNFR is its higher molecular weight and subsequent reduced volatility resulting in reduced removal of the shortstopping agent from a vinyl or diene polymerization, and particularly a polymerization in which the desired product is a synthetic rubber during monomer stripping. Still another advantage is that the SNFR, being relatively non-volatile is more likely to stay with the polymer during continued processing such as drying. Continued shortstopping of rubber polymerization during post polymerization steps will result in less change in the polymerization and an improved finished rubber product. The use of SNFRs would accordingly limit changes to the Mooney viscosity (molecular weight) by reducing gel. Gel is defined as areas of insoluble polymer caused by crosslinking of rubber molecules. The advantage for the use of SNFRs would be quicker and more complete termination of polymerization when used as a shortstopping agent.

SUMMARY OF THE INVENTION

In summary, this invention relates to a process for terminating a free-radical initiated, emulsion polymerization, the process characterized by the addition of a compound to stop the polymerization at a conversion level greater than 10% but less than 90%, the improvement comprising utilizing as the compound to stop the polymerization an effective amount of a material containing or capable of forming a stable nitroxide free-radical.

DETAILS

As stated earlier, this invention is a process for terminating a free-radical initiated, emulsion polymerization, the process characterized by the addition of a compound to stop the polymerization at a conversion level greater than 10% but less than 90%, the improvement comprising utilizing as the compound to stop the polymerization an effective amount of a material containing or capable of forming a stable nitroxide free-radical.

The SNFRs or stable nitroxide free-radical compounds useful in this invention have the generic structure:

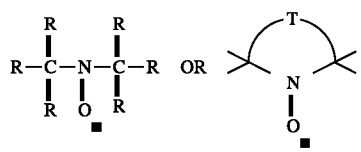

Where each R is alkyl and T is a group required to complete a 5- or 6-membered ring.

Two or more nitroxyl groups may be present in the same molecule by being linked through the T moiety as exemplified below where E is a linking group.

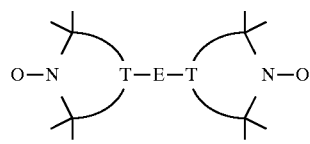

The SNFR compounds useful in this invention may preferably be selected from the group consisting of
di-tert-butyl nitroxyl,
1-oxyl-2,2,6,6-tetramethylpiperidine,
1-oxyl-2,2,6,6-tetramethylpiperidine-4-ol,
1-oxyl-2,2,6,6-tetramethylpiperidine-4-one,
1-oxyl-2,2,6,6-tetramethylpiperidine-4-yl acetate,
1-oxyl-2,2,6,6-tetramethylpiperidine-4-yl 2-ethylhexanoate,
1-oxyl-2,2,6,6-tetramethylpiperidine-4-yl stearate,
1-oxyl-2,2,6,6-tetramethylpiperidine-4-yl benzoate,
1-oxyl-2,2,6,6-tetramethylpiperidine-4-yl 4-tert-butylbenzoate,
bis(1-oxyl-2,2,6,6-tetramethylpiperidine-4-yl) succinate,
bis(1-oxyl-2,2,6,6-tetramethylpiperidine-4-yl) adipate,
bis(1-oxyl-2,2,6,6-tetramethylpiperidine-4-yl) sebacate,
bis(1-oxyl-2,2,6,6-tetramethylpiperidine-4-yl) n-butylmalonate,
bis(1-oxyl-2,2,6,6-tetramethylpiperidine-4-yl) phthalate,
bis(1-oxyl-2,2,6,6-tetramethylpiperidine-4-yl) isophthalate,
bis(1-oxyl-2,2,6,6-tetramethylpiperidine-4-yl) terphthalate,
bis(1-oxyl-2,2,6,6-tetramethylpiperidine-4-yl) hexahydrophthalate,
N,N'-bis(1-oxyl-2,2,6,6-tetramethylpiperidin-4-yl) adipamide
N-(1-oxyl-2,2,6,6-tetramethylpiperadin-4-yl)-caprolactam,
N-(1-oxyl-2,2,6,6-tetramethylpiperadin-4-yl)-dodecylsuccinimide,
2,4,6-tris-[butyl-N-(1-oxyl-2,2,6,6-tetramethylpiperidin-4-yl]-s-triazine, and
4,4'-ethylenebis(1-oxyl-2,2,6,6-tetramethylpiperazin-3-one).

A preferred SNFR for use in this invention is 4-hydroxy-2,2,6,6-tetramethylpiperidine-1-oxyl or its homologs. Likewise, the corresponding hydroxyl amines or other homologs of these SNFRs which could form an SNFR in situ are contemplated for use in this invention.

The SNFR is generally utilized in accordance with this invention at a level of from about 0.01 to 100 millimoles per Kg of monomer. In a preferred embodiment of the invention from about 0.1 to 10 millimoles of SNFR is utilized per Kg of monomer charged. The invention is applicable to a broad range of monomers that polymerize by free-radical polymerization. Monomers of this type include diene monomers and vinyl monomers or mixtures thereof. Suitable diene monomers include: 1,3-butadiene, isoprene, and chloroprene. Suitable vinyl monomers include: styrene, vinyl naphthalene, 2,4-dichloro styrene, divinylbenzene, acrylates, acrylonitrile, vinyl acetate, and vinyl chloride. The shortstop agents of this invention are preferably added to the polymerization to stop the polymerization at or after 10% conversion, but generally before 90% conversion is achieved. The choice of addition point will be dependent upon the particular monomers being employed, the properties desired for the finished polymer material, and the final use of the polymer product to which the nitroxyl free-radical substance is added. It will be within the perview of those skilled in the art to utilize the compounds of the invention to shortstop diene and vinyl polymerization processes. The use of the novel nitroxide materials of the invention to shortstop free-radical polymerization processes will be similar to conventional processes using known shortstop agents.

As an example, a polymerization would be conducted in the manner set forth in Lattime cited above.

| Materials | Parts |
| --- | --- |
| Styrene | 32.0 |
| Butadiene | 68.0 |
| Water | 215.0 |
| Fatty acid soap | 2.5 |
| Rosin acid soap | 2.5 |
| Dispersion aid | 0.18 |
| Total electrolyte | 0.45 |
| Chelated iron complex | 0.01 |
| Sodium formaldehyde sulfoxylate | 0.04 |
| Tertiary dodecyl mercaptan | 0.14 |
| Paramenthane hydroperoxide | 0.05 |

Polymerization would be done at 10° C. to 62% conversion of monomer to polymer. Shortstop agent would then be added in the form of an aqueous solution. The degree of conversion would then be measured by determination of the dry weight of resultant rubber from aliquots of the latex. Latex samples would be stored at 50° C. overnight and then aliquots would be analyzed to determine any increase in polymer. Anticipated results are shown below in Table I.

TABLE I

SHORTSTOP EXPERIMENTS

| RUN # | SHORTSTOP | CONC. (mmm) | CHANGE IN CONVERSION | CHANGE IN MOLECULAR WEIGHT |
|---|---|---|---|---|
| 1 | BLANK | 0 | POOR | |
| 2 | DTC/DEHA | 18/4 | GOOD | GOOD |
| 3 | IPHA | 4 | FAIR | FAIR |
| 4 | A | 4 | VERY GOOD | GOOD |
| 5 | A | 3 | VERY GOOD | GOOD |
| 6 | A | 2 | GOOD | FAIR |
| 7 | A | 0.4 | FAIR | POOR |
| 8 | B | 4 | GOOD | GOOD |
| 9 | B | 2 | GOOD | FAIR |
| 10 | B | 0.4 | FAIR | POOR | mmm—millimoles of shortstop per Kg of monomer initially charged
DTC—sodium dimethyldithiocarbamate
DBHA—diethylhydroxyl amine
IPHA—isopropylhydroxyl amine
A 4-hydroxy-2,2,6,6-tetramethylpiperidine-1-oxyl
B 1,4-dihydroxy-2,2,6,6-tetramethylpiperidinium formate As seen, the use of the SNFR materials in the process of the invention would provide an improvement to the art which is novel and unexpected.

The same procedure followed in Example 1 would be utilized except that the reaction would be vented to remove unreacted 1,3-butadiene. An aliquot of latex would be precipitated to determine the amount of styrene in the polymer. The resultant latex would be aged overnight at 60° C. washed, and the percent styrene in the polymer would be determined. Results are shown in Table II.

TABLE II

SHORTSTOP EXPERIMENTS

| RUN # | SHORTSTOP | CONC. (mmm) | CHANGE IN CONVERSION | CHANGE OF % STYRENE IN RUBBER |
|---|---|---|---|---|
| 1 | IPHA | 7 | GOOD | GOOD |
| | A | 6 | GOOD | FAIR |
| 2 | B | 6 | GOOD | FAIR |
| 3 | C | 5 | GOOD | GOOD |
| 4 | D | 5 | not soluble in latex | |

TABLE II-continued

SHORTSTOP EXPERIMENTS

| RUN # | SHORTSTOP | CONC. (mmm) | CHANGE IN CONVERSION | CHANGE OF % STYRENE IN RUBBER |
|---|---|---|---|---| mmm—millimoles of shortstop per Kg of monomer initially charged
IPHA—isopropylhydroxyl amine
A—di-tert-butylnitroxide
B—4-hydroxy-2,2,6,6-tetramethylpiperidine-1-oxy
C—1,4-dihydroxy-2,2,6,6-tetramethylpiperidinium formate
D—1-oxyl-2,2,6,6-tetramethylpiperidin-4-yl acetate
1) Latex is vented to remove butadiene,
2) Same procedure as Table I, but latex is aged at 60° C.,
3) Resultant rubber is purified and styrene in polymer is determined.

Having thus described our invention, we claim:

1. A process for terminating a free-radical initiated, emulsion polymerization, the process comprising the step of adding a compound to stop the polymerization at a conversion level greater than 10% but less than 90%, the improvement comprising utilizing as the compound to stop the polymerization an effective amount of a material containing or capable of forming a stable nitroxide free-radical.

2. The process of claim 1 wherein the free radical initiated emulsion polymerization is a polymerization of one or more monomers selected from the group consisting of: diene monomers, vinyl monomers and mixtures thereof.

3. The process of claim 2 wherein the diene monomers are selected from the group consisting of: 1,3-butadiene, isoprene, and chloroprene.

4. The process of claim 2 wherein the vinyl monomer is selected from the group consisting of: styrene, vinyl naphthalene, 2,4-dichlorostyrene, divinylbenzene, acrylates, acrylonitrile, vinyl acetate and vinyl chloride.

5. The process of claim 1 wherein said compound is 4-hydroxy-2,2,6,6-tetramethyl piperidine-1-oxyl or its homologs.

6. The process of claim 1 wherein the compound is used in an amount of from 0.01 to 100 millimoles per Kg of monomer charged.

7. The process of claim 1 wherein the compound is used in an amount of from about 0.1 to 10 millimoles per Kg of monomer.

8. The process of claim 1 wherein a compound selected from the group consisting of: hydroxylamines, bisulfites, dithiocarbamates, thiurams, and alkali metal polysulfides is added in addition to the stable nitroxide.

9. The process of claim 1 wherein said stable nitroxide free radical is not a nitrosamine precursor.

* * * * *